United States Patent
Liu et al.

(10) Patent No.: US 11,267,234 B2
(45) Date of Patent: *Mar. 8, 2022

(54) COMPOSITE PANEL

(71) Applicant: JETCOAT (Shanghai) CO Ltd, China, Shanghai (CN)

(72) Inventors: Huihuang Liu, Taoyuan (TW); Tungyueh Liu, Shanghai (CN); Juntai Huang, Shanghai (CN); Kuojiun Liu, Shanghai (CN)

(73) Assignee: JETCOAT (SHANGHAI) CO LTD, CHINA, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/093,974

(22) PCT Filed: Oct. 23, 2017

(86) PCT No.: PCT/CN2017/107217
§ 371 (c)(1),
(2) Date: Oct. 16, 2018

(87) PCT Pub. No.: WO2019/079919
PCT Pub. Date: May 2, 2019

(65) Prior Publication Data
US 2021/0221112 A1  Jul. 22, 2021

(51) Int. Cl.
B32B 7/12       (2006.01)
B32B 27/30      (2006.01)
B32B 21/08      (2006.01)
B32B 21/14      (2006.01)
B32B 27/08      (2006.01)
B32B 27/20      (2006.01)
C08L 97/02      (2006.01)
E04F 15/10      (2006.01)

(52) U.S. Cl.
CPC .............. *B32B 27/304* (2013.01); *B32B 7/12* (2013.01); *B32B 21/08* (2013.01); *B32B 21/14* (2013.01); *B32B 27/08* (2013.01); *B32B 27/20* (2013.01); *C08L 97/02* (2013.01); *E04F 15/107* (2013.01); *B32B 2255/10* (2013.01); *B32B 2255/26* (2013.01); *B32B 2264/0257* (2013.01); *B32B 2264/067* (2013.01); *B32B 2264/101* (2013.01); *B32B 2264/1022* (2020.08); *B32B 2307/304* (2013.01); *B32B 2307/4026* (2013.01); *B32B 2307/412* (2013.01); *B32B 2307/554* (2013.01); *B32B 2307/7265* (2013.01); *B32B 2471/00* (2013.01)

(58) Field of Classification Search
CPC ........ C08L 27/06; C08L 23/286; C08L 53/02; C08L 91/08; C08L 2205/025; C08L 2205/035; C08L 25/06; C08L 97/02; C08K 13/02; B32B 15/082; B32B 21/02; B32B 21/08; B32B 27/06; B32B 27/18; B32B 9/00; E04F 13/0866; E04F 13/0871; E04F 13/0885; E04F 13/0887; E04F 13/0891; E04F 13/0894; E04F 13/18; E04F 15/02005; E04F 15/02155; E04F 15/10; E04F 2201/023; E04F 2201/043; F16B 5/0016; F16B 5/008
See application file for complete search history.

(56) References Cited

PUBLICATIONS

Huang et al, CN 106223569A , Jan. 15, 2016.*

* cited by examiner

*Primary Examiner* — Lawrence D Ferguson
(74) *Attorney, Agent, or Firm* — Duane Morris LLP; Thomas J. Kowalski; Deborah L. Lu

(57) ABSTRACT

The present invention provides a composite panel, containing a substrate layer and at least one functional layer disposed above and/or below the substrate layer. The composite panel of present invention is environmentally friendly with zero formaldehyde, elastic and comfortable to touch, and has good appearance. The composite panel of the present invention may subject to surface treatments in accordance with actual needs to provide better functionality and practicality.

14 Claims, No Drawings

COMPOSITE PANEL

FIELD OF THE INVENTION

This invention relates to building materials, specifically to a composite panel.

BACKGROUND OF THE INVENTION

At present, traditional wood floors are mostly solid. The use of solid wood floors consumes a large quality of woods, which destroys the environment and makes the floorings rather expensive. Therefore, it is quite necessary to seek alternatives to the existing solid wood floors.

Polyvinyl chloride (PVC) is one of the most widely used universal plastics. For a long time, it was used in the field of building materials, for example, as the panel or pipe material. In the field of panel material, the commonly used PVC panels include those made of hard PVC and soft PVC, which two have different plasticizer contents and accordingly distinct properties. The plasticizer content of hard PVC is less than 10%, while the plasticizer content of soft PVC is 30-70%.

The plasticizer is a polymer additive widely used in industries. With the plasticizer added in the processing of plastics, the flexibility is enhanced, making them easier to process. Based on the chemical structures, plasticizers are generally classified into aliphatic dicarboxylic acid ester-, benzenedicarboxylic acid ester-, benzene polycarboxylic acid ester-, benzoate-, polyol ester-, chlorinated hydrocarbon-, epoxy-, citric acid ester-, polyester-based plasticizers. Among these, the most commonly used ones are phthalic acid ester- or phthalic acid salt-based plasticizers, such as di-2-ethylhexyl phthalate (DEHP) and dibutyl phthalate (DBP). Plasticizers are somewhat toxic to human bodies, and slowly escape from the PVC materials as time passes by, posing a threat to human health. Compared to soft PVC, hard PVC is healthier and more environmentally friendly due to less plasticizer contents, and thus used as long-run indoor decorative panel materials.

Hard PVC is also flame retardant, water-resistant, and recyclable. Therefore, it is widely applied to building materials, especially panel materials. However, traditional hard PVC has apparent defects, such as high hardness. When used as panel materials, especially for floors, hard PVC cannot provide good feel in touch. In addition, the color of traditional hard PVC is quite monotonous and dull, resulting in poor visual effects. With these shortcomings, traditional hard PVC is unable to meet the requirements for comfortableness and good appearance, and thus marketed as low-end building materials.

Further, for good appearance and practicality, traditional PVC panels are often coated with a certain paint. The PVC panels are subject to an adherence enhancement treatment before paint coating, i.e., to paint on the panel surface a layer of adherence promoters having good bonding capacity to both PVC and the coating paint, to firmly bond the paint to panel surfaces. Such a treatment makes the processing procedure of traditional PVC panels even more complicated.

SUMMARY OF THE INVENTION

It would, therefore, be desirable to have a new type of composite panel with a unique substrate sheet that overcomes the above shortcomings. The composite panel is environmentally friendly, comfortable to touch, and has good appearance. The composite panel of present invention may be subject to certain surface treatments, if needed, to enable better functionality and practicality.

The present invention provides a composite panel, comprising a substrate layer and at least one functional layer, wherein the at least one functional layer is disposed above and/or below the substrate layer, wherein the substrate layer is composed of the following materials at the mass ratio,

| | |
|---|---|
| PVC resin or PVC powder | 100 parts |
| stone powder or sawdust or rocks | 150-300 parts |
| an additive | 1-10 parts |
| a molding optimizing agent | 0.01-1 part. |

The additive is one or more selected from the group consisting of a stabilizer, stearic acid, PE wax, chlorinated polyethylene, a modifier, a dye, a whitening agent and a plasticizer.

The molding optimizing agent is produced by polymerizing a polyol, an unsaturated polycarboxylic acid and an amino acid, treating the resultant polymers with a halogenating agent, and polymerizing the resulting product with maleic acid.

In one embodiment of the present invention, the molding optimizing agent is prepared by the steps of:

1) adding an polyol and an unsaturated polycarboxylic acid into a polymerization reactor in turn, allowing the mixture to react at the presence of a catalyst at 120-160° C. for 1-5 hours, adding an amino acid, allowing the mixture to react at 60-120° C. for 0.5-1.5 hours, and removing water to obtain polymers, wherein the catalyst is a Brønsted acid (such as concentrated sulfuric acid), a phase-transfer catalyst, and the like;

2) halogenating the polymers obtained in step 1) using a halogenating agent at the presence of an initiator at 60-120° C. for 0.5-5 hours to obtain an intermediate halogenated product, wherein the initiator may be magnesium, DBU, and the like; and 3) adding the intermediate halogenated product and maleic acid into a reactor in turn, allowing them to react at 120-150° C. for 1-3 hours, raising the temperature to 200-280° C., allowing the polymerization reaction to proceed for 2-8 hours, and removing water to obtain the target molding optimizing agent, wherein an alkaline agent may be added as an catalyst at an amount of 1 wt % based on total reactants.

The polyol, the unsaturated polycarboxylic acid and the amino acid are present at a molar ratio of 1:0.1-20:0.01-50.

The mass ratio of the polymers to the halogenating agent is 1:0.2-1. The halogenating agent may be chlorine gas, bromine gas, phosgene, NBS, DBBA, DBI, and the like.

The mass ratio of the intermediate halogenated product to maleic acid is 1:1.5-10.

In one embodiment of the present invention, the polyol is one or more selected from the group consisting of ethylene glycol, 1,2-propanediol, dipropylene glycol, 1,4-butanediol, 1,6-hexanediol, neopentyl glycol, diethylene glycol, dipropylene glycol, trihydroxymethyl propane, pentaerythrotol and glycerol.

In one embodiment of the present invention, the unsaturated polycarboxylic acid is one or more polycarboxylic acids having 20 or less carbon atoms.

In one embodiment of the present invention, the composite panel is produced by the following materials at the mass ratio,

| | |
|---|---|
| PVC resin or PVC powder | 100 parts |
| Stone powder or sawdust | 210-270 parts |
| Perlite | 0-80 parts |

-continued

| | |
|---|---|
| a stabilizer | 2-6 parts |
| Stearic acid | 0.2-0.8 part |
| PE wax | 0.2-0.8 part |
| Chlorinated polyethylene | 1-5 parts |
| an ACR modifier | 0.5-2 parts |
| Titanium dioxide powder | 1-5 parts |
| a whitening agent | 0.01-0.05 part |
| a molding optimizing agent | 0.1-0.5 part. |

In one embodiment of the present invention, the functional layer is one or more selected from the group consisting of a patterned layer, a wear-resistant layer, a paint layer, a veneer layer, a thermal insulating layer, a waterproof layer, a skid-proof layer, and an adhesive layer.

The patterned layer may a PVC patterned sheet, a patterned timber, a patterned plastics material, a patterned sheet, a patterned stone material, or any material that can be patterned by means of patterning, corrosion and/or carving.

The wear-resistant layer may be made of a PVC based wear-resistant material, or a stiff wear-resistant material such as a stone-like material.

The paint layer is provided for the coloring of the panel.

The veneer layer may be a PVC veneer, a wood veneer, a calcium carbonate veneer, a silica veneer, a plastic veneer, a fabric veneer and the like.

The thermal insulating layer may be a hollow plate, or made of thermal insulating materials such as PVC.

The waterproof layer is usually disposed at the bottommost part of the panel, or above the patterned layer, to protect the panel from being affected by the moisture or dropped water.

The skid-proof layer is generally composed of lines on the panel, and such lines are mostly bulging structures, such as wavy lines, tread patterns and the like, to provide an anti-skid effect.

The adhesive layer is generally composed of adhesives used for bonding layers.

In one embodiment of the present invention, the functional layer is made of one or more composite materials selected from the group consisting of wood, a non-woven fabric, bamboo, a bamboo board, a metal board, a WPC sheet, a PVC sheet, a LVT plate, a calcium silicate board, an aluminum plastic sheet, a plastic sheet, a PVC coiled sheet, a bamboo-wood composite board, an aluminum-magnesium sheet, a wood-plastic board, a stone board, a volcanic lime sheet, a calcium silicon carbonate board, a plastic film, a gypsum board, a glass sheet, a foam board, a melamine plate, a PVC wear-resistant layer, a PVC patterned sheet, a PVC cushion, and a PE film.

In one embodiment of the present invention, a crosslinking layer is disposed between the substrate layer and the functional layer.

When multiple functional layers are disposed above or below the substrate layer, a crosslinking layer is placed between each two adjacent functional layers. The crosslinking layer is used for increasing the bonding strength of each two adjacent layers.

In one embodiment of the present invention, the crosslinking layer is obtained by mixing the following materials at the mass ratio followed by extrusion molding of the resulting mixture,

| | |
|---|---|
| a crosslinking particle | 100 parts |
| a filler | 50-70 parts |
| an additive | 1-10 parts. |

The filler is one or more selected from the group consisting of carbon black, white carbon black (silica), titanium dioxide, precipitated calcium carbonate, silicic acid, and silicon oxide.

The additive is one or more selected from the group consisting of an antioxidant, a plasticizer, a cross-linker, a stabilizer, a thermal sensitizer, a dye, and a surfactant.

The crosslinking particle is obtained by polymerizing the following materials at the molar ratio, and then grinding, screening and granulating the resulting polymers,

| | |
|---|---|
| a polycarboxylic acid | 1 part |
| a polyamine | 0.1-10 parts |
| Vinyl chloride | 1-10 parts. |

In one embodiment of the present invention, the crosslinking particle is prepared by adding a polycarboxylic acid and a polyamine into a reactor in turn, allowing the mixture to react at 120-150° C. for 1-3 hours, removing water, adding vinyl chloride, allowing high-pressure polymerization reaction of the mixture to proceed at 220-280° C. for 0.5-5 hours to obtain a crosslinking substrate, and cooling and screening the crosslinking substrate to obtain crosslinking particles.

The polycarboxylic acid is one or more selected from the group consisting of a dicarboxylic acid and a tricarboxylic acid each having 6 or less carbon atoms.

The polyamine is one or more polyamines each having 12 or less carbon atoms.

In one embodiment of the present invention, the layers of the composite panel are bonded together by one-pass or multi-pass or continuous cold or hot press molding at room temperature.

The cold or hot press molding is performed at a pressure of 8-12 kg/cm$^2$.

The cold or hot press molding lasts for 10-100 minutes.

The cold press molding is done at a temperature of 10-35° C.;

The hot press molding is done at a temperature of 60-180° C.

In one embodiment of the present invention, a UV coating is disposed at the uppermost part of the composite panel.

The UV coating is disposed on the composite panel by brushing on the composite panel with a UV paint, and then irradiating to harden the paint with a lighting equipment at wavelengths of 200 nm-450 nm.

In one embodiment of the present invention, the UV paint is prepared by using the following materials at the mass ratio,

| | |
|---|---|
| a copolymer | 30-50% |
| an active monomer | 40-60% |
| a photo-initiator | 3-10% |
| an additive | 1-10%. |

The copolymer is a product from oligomerization of one or more selected from the group consisting of acrylic anhydride, alkyl acrylic anhydride and 2,4-pentadienoic acid, with one or more amino acids, cis-butadiene and/or trans-butadiene, and one or more selected from the group consisting of a diol, a triol, and a tetraol each having 6 or less carbon atoms. In other words, the polymer is produced by adding the materials mentioned above into a reactor with a phase-transfer catalyst, allowing the mixture to react at 60-230° C. for 1-12 hours, and removing water. The molar ratio of one or more selected from acrylic anhydride, alkyl acrylic anhydride and 2,4-pentadienoic acid:the amino acid(s):cis-butadiene and/or trans-butadiene:one or more selected from the diol, the triol, and the tetraol having 6 or less carbon atoms is 1:0.1-5:1-4:0.5-2.

The active monomer is one or more acrylic acid esters.

The photo-initiator is one or more free radical-creating photo-initiators.

The additive is one or more selected from the group consisting of an adhesion promoter, a defoamer, a leveling agent, a wetting agent, and an antioxidant.

In one embodiment of the present invention, the active monomer is one or more products obtained from the esterification reaction of one or more selected from the group consisting of acrylic acid, alkyl acrylic acid, acrylic anhydride, alkyl acrylic anhydride, 2,4-pentadienoic acid, and 2,4-pentadienoic anhydride, with one or more selected from the group consisting of a monohydric alcohol, a diol, a triol, and a tetraol each having 1-12 carbon atoms.

The defoamer is a silicone defoamer.

The leveling agent is an organosilicon leveling agent.

The wetting agent is a modified polydimethylsiloxane.

The antioxidant is a hindered phenol antioxidant.

The photo-initiator is one or more selected from the group consisting of 2-hydroxyl-2-methyl-1-phenyl-1-acetone, 1-hydroxyl-cyclohexyl phenylmethanone, 2,4,6-trimethyl-benzoyl-diphenyl phosphine oxide, bis(2,4,6-trimethylbenzoyl)phenyl phosphine oxide, 2,4,6-trimethyldiphenyl-methanone, 4-methyldiphenylmethanone, 2-phenylbenzyl-2-dimethyl amino-1-(4-morpholinobenzylphenyl)butanone.

In one embodiment of the present invention, alumina particles and/or silicon carbide (SiC) particles each having a particle size of 20-300 μm are distributed in the UV paint.

The present invention provides a special composite panel, which is environmentally friendly with zero formaldehyde, elastic and comfortable to touch, and has good appearance. The composite panel of the present invention may subject to certain surface treatments in accordance with actual needs to provide better functionality and practicality.

In the present invention, a molding optimizing agent is used to optimize the main substrate layer of the composite panel material. The molding optimizing agent, with its unique structure features, can enclose and seize small molecules of all kinds, making them evenly distributed on and bonded with the resin. The small molecules are bonded to active sites of the resin, promoting the molecular bonds to undertake a process similar to self-assembly, so that the components become smoother and more likely to be melted during the extrusion molding process. Further, with the molding optimizing agent and accordingly the intermolecular covalent bonds, the substrate layer becomes more elastic (elasticity increased by about 510% compared to a composite panel without the molding optimizing agent, as indicated in an experiment), more flexible (flexibility increased by about 300% compared to a composite panel without the molding optimizing agent, as shown in an experiment), and stiffer. Also, the use of the molding optimizing agent provides the panel with enhanced bonding ability to other panel materials in hot or cold press molding, so that the resulting composite multi-layered panel is less likely to split or delaminate (as shown in an experiment, after bonded with a veneer layer of PVC or the like by hot press molding, the resulting composite panel had the probability of detachment or splitting decreased by 600% or more when frequently used or used in extremely cold or hot conditions; and detachment of the veneer layer rarely occurred when the composite panel was in normal use). Further, since the composite panel is subject to hot press molding, there is no safety issue brought by, for example, addition of the glue.

In addition, in order to improve the bonding strength of the substrate layer with the veneer layer made of materials such as wood, stone, or textiles which are less likely to be bonded by hot press molding, an intermediate crosslinking layer is arranged to promote panel forming by hot press molding. The intermediate crosslinking layer is made of a polymer material, which is placed between adjacent layers. With its unique structural design, the polymer particles have unreacted active sites, including the amino, carboxyl, halogen groups, protruding from the polymers' backbone chains upon completion of the polymerization reaction. These active sites will react with or form weak bonds with polymers or free molecules on other layers during hot press molding, so the substrate layer will better bond with other layers, strengthening the binding force of each two adjacent layers.

Further, the present invention also provides a novel UV coating having specific components at a selected ratio, which has improved performance and shortened curing time, where the curing efficiency is increased by about 150%.

DETAILED DESCRIPTION OF THE INVENTION

Example 1. Composite Panel 1#

Composite panel 1# was composed of a substrate layer 1#, a veneer layer and a wear-resistant layer. The substrate layer, the veneer layer and the wear-resistant layer were subject to hot press molding (8-12 kg/cm$^2$, 60° C., 25 min) to prepare the composite panel 1#.

The veneer layer was a PVC veneer, 0.15 mm thick, provided above the substrate layer.

The wear-resistant layer was a PVC wear-resistant layer, 0.20 mm thick, provided below the substrate layer.

The substrate layer 1#, 0.5 mm in thickness, was produced by an extrusion molding machine using the following materials at the mass ratio.

| | |
|---|---|
| PVC resin | 100 parts |
| Stone powder | 210 parts |
| Perlite | 60 parts |
| a stabilizer | 2 parts |
| Stearic acid | 0.8 part |
| PE wax | 0.2 part |
| Chlorinated polyethylene | 1 part |
| a ACR modifier | 2 parts |
| Titanium dioxide powder | 1 part |
| a whitening agent | 0.01 part |
| Molding optimizing agent 1# | 0.1 part |

The molding optimizing agent 1# was produced as follows. Ethylene glycol (1 equiv) and 1,4-succinic acid (1.5 equiv) were added into a reactor in turn, and the mixture was subject to a reaction at the presence of a phase-transfer catalyst at 120° C. for 1 hour. Then, with the addition of phenylalanine (0.1 equiv), the reaction continued at 120° C. for another 0.5 hour. Water was removed to obtain polymers. After chlorine gas was introduced into the reactor at a rate of 0.5 L/h, the reaction was allowed to proceed at 120° C. for 1.5 hours. Thereafter, nitrogen gas was introduced into the reactor to remove the gas inside the reactor. With the addition of maleic acid (2 equiv), the reaction was performed at around 145° C. for 1 hour. Then, the reaction temperature was raised to 200° C. where polymerization reaction was performed for 8 hours. Water was removed, and target molding optimizing agent 1# was obtained.

Composite panel 1# as produced in Example 1 was tested for characteristics compared to Composite panel 01# having no molding optimizing agent which was prepared by binding layers together using an adhesive where a hot press molding was not applicable.

A. Formaldehyde Test

Rooms were floored with 100 m² of either of the panels, and then closed. Air-conditionings were used to raise the room temperature to 28° C. 120 hours later, no formaldehyde was detected in the room with Composite panel 1# while the concentration of formaldehyde was 13 mg/m² in the room with Composite panel 01#.

B. Bending Test

The panels were repeatedly bent at an included angle of 15°. After bent for 18 times, the panels were tested for the deformation extent of patterns at the bending site. It was found that the pattern deformation extent was 0.5% for Composite panel 1#, and the bending site seemed to be normal in color. In contrast, the pattern deformation extent was proved to be 56.9%, and the panel turned white and cracked at the bending site.

C. Elasticity Test

Composite panel 1# proceeded with elastic deformation with applied forces and recovered quickly upon force removal, with the surface deformation extent less than 0.1%. Composite panel 01# can't proceed with elastic deformation under stress condition.

Example 2. Composite Panel 2#

Composite panel 2# was composed of a substrate layer 2#, a veneer layer and two wear-resistant layers. The substrate layer, the veneer layer and the wear-resistant layers were subject to hot press molding (8-12 kg/cm², 60° C., 25 min) to prepare the composite panel 2#.

The veneer layer was a PVC wood-like veneer, 0.05 mm thick, provided above the substrate layer.

The two wear-resistant layers were PVC wear-resistant layers, 0.15 mm thick each, provided below the substrate layer and above the veneer layer, respectively. The one on the uppermost was transparent.

The substrate layer 2#, 0.5 mm in thickness, was produced by an extrusions molding machine using the following materials at the mass ratio.

| PVC resin | 100 parts |
|---|---|
| Sawdust | 270 parts |
| a stabilizer | 1.2 parts |
| Stearic acid | 1.5 parts |
| PE wax | 1 part |
| Chlorinated polyethylene | 1.5 parts |
| a ACR modifier | 3 parts |
| an antioxidant | 0.5 part |
| a dye | 1 part |
| Molding optimizing agent 2# | 1 part |

The molding optimizing agent 2# was produced as follows. Propylene glycol (1 equiv) and 1,5-pentanedioic acid (5 equiv) were added into a reactor in turn, and the mixture was subject to a reaction at the presence of concentrated sulfuric acid (0.01 equiv) at 120° C. for 2.5 hours. Then, with the addition of glycine (0.5 equiv), the reaction continued at 80° C. for another 1.5 hours. Water was removed to obtain polymers. After phosgene was introduced into the reactor at a rate of 0.5 L/h, the reaction was allowed to proceed at 120° C. for 1.5 hours. Thereafter, nitrogen gas was introduced to remove the gas inside the reactor. With the addition of maleic acid (10 equiv), the reaction was performed at around 125° C. for 1.5 hours. Then, the reaction temperature was raised to 230° C. where polymerization reaction was performed for 5 hours. Water was removed, and the target molding optimizing agent 2# was obtained.

Example 3. Composite Panel 3#

Composite panel 3# was composed of a substrate layer 3#, a pattern layer, a wear-resistant layer, a waterproof layer and a skid-proof layer. The substrate layer 3#, the pattern layer, the wear-resistant layer, the waterproof layer and the skid-proof layer were subject to hot press molding (8-12 kg/cm², 80° C., 15 min) to prepare the composite panel 3#, the uppermost part of which was coated with a UV paint 3#.

The pattern layer was a PVC pattern sheet with patterns printed, 0.1 mm in thickness, provided above the substrate layer.

The wear-resistant layer was a transparent PVC wear-resistant layer, 0.15 mm thick, provided above the pattern layer.

The waterproof layer was a board made of waterproof materials, 0.1 mm in thickness, provided below the substrate layer.

The skid-proof layer was made of PVC, with tread patterns, 0.2 mm in thickness, provided below the waterproof layer.

The substrate layer 3#, 0.3 mm in thickness, was produced by an extrusion molding machine using the following materials at the mass ratio.

| PVC powder | 100 parts |
|---|---|
| Sawdust | 270 parts |
| Perlite | 80 parts |
| a stabilizer | 1 part |
| Stearic acid | 0.3 part |
| PE wax | 1 part |
| Molding optimizing agent 2# | 0.5 part |

The molding optimizing agent 3# was produced as follows. Diethylene glycol (1 equiv) and 1,4-succinic acid (5 equiv) were added into a reactor in turn, and the mixture was subject to a catalytic reaction at 160° C. for 0.5 hour. Then, with the addition of tryptophan (0.05 equiv), the reaction continued at 60° C. for another 0.5 hour. Water was removed to obtain polymers. After NBS (0.2 equiv) was introduced into the reactor, the reaction was allowed to proceed at 160° C. for 1 hour. Water-soluble matters were removed. Thereafter, with the addition of maleic acid (10 equiv), the reaction was performed at around 120° C. for 2 hours. Then, the reaction temperature was raised to 280° C. where polymerization reaction was performed for 3 hours. Water was removed, and the target molding optimizing agent 3# was obtained.

The UV paint 3# was produced by mixing the following materials at the mass ratio. When applied to use, the UV paint was coated on the surface of Composite panel 3# and then subject to 10 min of UV irradiation for curing.

| A copolymer | 30% |
|---|---|
| 2,4-pentadienoic acid | 30% |
| Acrylic anhydride | 19% |
| 2-hydroxyl-2-methyl-1-phenyl-1-acetone, 1-hydroxy cyclohexyl benzophenone | 10% |

| γ-glycidyloxypropyltrimethoxysilane | 5% |
| --- | --- |
| a silicone defoamer | 2% |
| an organosilicon leveling agent | 1.5% |
| a modified polydimethylsiloxane | 2% |
| a hindered phenol antioxidant | 0.5% |

The copolymer was prepared as follows. Acrylic anhydride (1 equiv), 2,4-pentadienoic acid (1 equiv), glutamic acid (0.1 equiv), cis-butadiene (2 equiv), and pentaerythrotol (2 equiv) were added into a reactor in turn, heating the mixture to 120° C., allowing the reaction to proceed for 4 hours, drying the resulting copolymer, and grinding the copolymer to 100-200 mesh.

Example 4. Composite Panel 4#

Composite panel 4# was composed of a substrate layer 4#, a pattern layer, a wear-resistant layer, a waterproof layer, a skid-proof layer and crosslinking layers 4#. The substrate layer 4#, the pattern layer, the wear-resistant layer, the waterproof layer, the skid-proof layer and the crosslinking layers 4# were subject to hot press molding (8-12 kg/cm$^2$, 80° C., 15 min) to prepare the composite panel 4#, the uppermost part of which was coated with a UV paint 4#.

The pattern layer was a PVC pattern sheet with patterns printed, 0.1 mm thick, provided above the substrate layer.

The wear-resistant layer was a transparent PVC wear-resistant layer, 0.15 mm thick, provided above the pattern layer.

The waterproof layer was a board made of a waterproof material, 0.1 mm in thickness, provided below the substrate layer.

The skid-proof layer was made of PVC with tread patterns, 0.2 mm in thickness, provided below the waterproof layer.

The substrate layer 4# with 0.3 mm in thickness was produced by an extrusion molding machine using the following materials at the mass ratio.

| PVC powder | 100 parts |
| --- | --- |
| Sawdust | 240 parts |
| Perlite | 30 parts |
| a stabilizer | 1 part |
| Stearic acid | 1.3 parts |
| PE wax | 2 parts |
| a dye | 0.8 part |
| Molding optimizing agent 2# | 0.5 part |

The UV paint 4# was produced by mixing the following materials at the mass ratio. When applied to use, the UV paint was coated on the surface of Composite panel 4# and then subject to 15 min of UV irradiation for curing.

| A copolymer | 50% |
| --- | --- |
| 1,5-pentadienoic acid | 10% |
| 4-methyldiphenylmethanone | 8% |
| γ-glycidyloxypropyltrimethoxysilane | 5% |
| a silicone defoamer | 2% |
| a modified polydimethylsiloxane | 2% |
| a hindered phenol antioxidant | 0.5% |

The copolymer was prepared as follows. Acrylic anhydride (1 equiv), methacrylic acid (1.5 equiv), glycine (0.5 equiv), cis-butadiene (5 equiv), and propylene glycol (2 equiv) were added into a reactor in turn followed by concentrated sulfuric acid (0.01 equiv), heating the mixture to 160° C., allowing the reaction to proceed for 4 hours, drying the resulting copolymer, and grinding the copolymer to 100-200 mesh.

Crosslinking layers 4# were placed between the pattern layer and the substrate layer, between the substrate layer and the waterproof layer, and between the waterproof layer and the skid-proof layer, respectively.

The crosslinking layer 4# was produced as follows. Ethanedioic acid (1 equiv) and ethylenediamine (1 equiv) were added into a reactor in turn, and the mixture was reacted at 150° C. for 1 hour. After water was removed, chloroethylene (2 equiv) was added. High pressure polymerization reaction proceeded at 220° C. for 0.5 hour to obtain a crosslinking substrate, which was cooled, dried and screened to provide crosslinking particles of 200-500 mesh. 150 parts of the crosslinking particles were mixed with 90 parts of titanium dioxide powder, 5 parts of an antioxidant, 5 parts of a plasticizer, 1 part of a cross-linker, 1 part of a stabilizer, 1 part of a thermos-sensitizer and 10 parts of a non-ionic surfactant. The mixture was then treated with extrusion molding to get the crosslinking layer 4#.

Example 5. Composite Panel 5#

Composite panel 5# was composed of a substrate layer 4#, a wood veneer, a waterproof layer, a skid-proof layer and a crosslinking layer 5#. The substrate layer 4#, the wood veneer, the waterproof layer, the skid-proof layer and the crosslinking layer 5# were subject to hot press molding (8-12 kg/cm$^2$, 80° C., 15 min).

The wood veneer of 0.1 mm in thickness was provided above the substrate layer.

The waterproof layer was a board made of a waterproof material, 0.1 mm thick, provided below the substrate layer.

The skid-proof layer was made of PVC, with tread patterns, 0.2 mm in thickness, provided below the waterproof layer.

A crosslinking layer 5# was provided between the wood veneer and the substrate layer.

The crosslinking layer 5# was prepared as follows. Propandioic acid (1 equiv) and ethylenediamine (1.5 equiv) were added into a reactor in turn, and the mixture was reacted at 150° C. for 1 hour. After water was removed, chloroethylene (5 equiv) was added. High pressure polymerization reaction proceeded at 280° C. for 2.5 hours to obtain a crosslinking substrate, which was cooled, dried and screened to provide crosslinking particles of 200-500 mesh. 100 parts of the crosslinking particles were mixed with 50 parts of calcium carbonate, 1 part of an antioxidant, 5 parts of a plasticizer, 1 part of a stabilizer, and 1 part of a non-ionic surfactant. The mixture was then treated with extrusion molding to get the crosslinking layer 5#.

Composite panel 5# as produced in Example 5 was tested for characteristics compared to Composite panel 02# which was prepared by hot press molding but had no crosslinking layer.

A. Formaldehyde Test

No formaldehyde was detected in both panels.

B. Bending Test

The panels were repeatedly bent at an included angle of 15°. After bent for 20 times, the panels were tested for the deformation extent of patterns at the bending site. It was found that the pattern deformation extent was less than 0.5% for Composite panel 5#, and the bending site seemed to be normal in color. In contrast, the deformation extent of the veneer was proved to be 45.3%, and the panel turned white and cracked at the bending site.

C. Tear Strength Test

The panels were soaked for a whole day, and then dried by hot blowing air. After the procedure was repeated for 25 times, the layers were hard to separate from each other in composite panel 5#. In contrast, the veneer layer of composite panel 02# was found in loose contact with the substrate layer, and the marginal part may be peeled off. After the procedure was repeated for 100 times, the layers were hard to separate from each other in composite panel 5# while the veneer layer can be peeled off the substrate layer in composite panel 02#.

Example 6. Composite Panel 6#

Composite panel 6# was composed of a substrate layer 1#, a PVC patterned sheet, a PVC wear-resistant layer and a PVC skid-proof film. The substrate layer 1#, the PVC patterned sheet, the PVC wear-resistant layer and the PVC skid-proof film were subject to a one-pass hot press molding process in an extruder. The resulting Composite panel 6# was spray coated with a UV paint 4# on the surface(s).

The substrate layer 1# was 3.0 mm in thickness.

The PVC patterned sheet was 0.07 mm in thickness, and provided above the substrate layer 1#.

The PVC wear-resistant layer was 0.3 mm thick, and provided above the PVC patterned sheet.

The PVC skid-proof film was 0.2 mm in thickness, and provided below the substrate layer 1#.

Example 7. Composite Panel 7#

Composite panel 7# was composed of a substrate layer 1#, a PVC patterned sheet, a PVC wear-resistant layer, an adhesive layer and a sound-attenuating pad. The substrate layer 1#, the PVC patterned sheet, and the PVC wear-resistant layer were bonded together by hot press molding in an extruder. The sound-attenuating pad was bonded by cold press molding using an adhesive spreader. The resulting Composite panel 7# was spray coated with a UV paint 3# on the surface(s).

The substrate layer 1# was 4.0 mm in thickness.

The PVC patterned sheet was 0.07 mm thick, provided above the substrate layer 1#.

The PVC wear-resistant layer was 0.5 mm in thickness, provided above the PVC patterned sheet.

The sound-attenuating pad was 1.0 mm in thickness, and bonded to the bottom face of the substrate layer 1# through continuous cold pressing by an adhesive spreader.

Example 8. Composite Panel 8#

Composite panel 8# was composed of a substrate layer 2#, an adhesive for wood veneer, and a wood veneer. The substrate layer 2#, the adhesive, and the wood veneer were bonded together by one-pass cold press molding. The resulting Composite panel 8# was spray coated with a UV paint 4# on the surface(s).

The substrate layer 2# was 4.8 mm in thickness.

The wood veneer was 0.45 mm in thickness, and provided above the substrate layer 2#.

Example 9. Composite Panel 9#

Composite panel 9# was composed of a substrate layer 3#, an adhesive for wood veneer, a wood veneer, an adhesive for sound-attenuating pad, and a sound-attenuating pad. The substrate layer 3#, the adhesive for wood veneer and the wood veneer were subject to one-pass cold press molding, and the sound-attenuating pad was bonded thereto by cold press molding using an adhesive spreader. The resulting Composite panel 9# was spray coated with a UV paint 4# on the surface(s).

The substrate layer 3# was 4.0 mm in thickness.

The wood veneer was 0.45 mm thick, and provided above the substrate layer 3#.

The sound-attenuating pad was 1.5 mm in thickness, and bonded to the bottom face of the substrate layer 3# through continuous cold pressing by an adhesive spreader.

What is claimed is:

1. A composite panel, comprising:
    a substrate layer; and
    at least one functional layer disposed above the substrate layer and/or below the substrate layer,
    wherein the substrate layer is made of the following materials at the mass ratio:

| | |
|---|---|
| PVC resin or PVC powder | 100 parts, |
| Stone powder or sawdust or rocks | 150-300 parts, |
| an additive | 1-10 parts, and |
| a molding optimizing agent | 0.01-1 part, | wherein the additive is one or more selected from the group consisting of a stabilizer, stearic acid, PE wax, chlorinated polyethylene, a modifier, a dye, a whitening agent and a plasticizer,
   wherein the molding optimizing agent is obtained by polymerizing a polyol, an unsaturated polycarboxylic acid and an amino acid, treating the resultant polymers with a halogenating agent, and polymerizing the resulting halogenated product with maleic acid.

2. The composite panel of claim 1, wherein the molding optimizing agent is prepared by the steps of:
    1) adding the polyol and the unsaturated polycarboxylic acid into a polymerization reactor in turn, allowing a catalytic reaction to proceed at 120-160° C. for 1-5 hours, adding the amino acid, allowing the mixture to react at 60-120° C. for 0.5-1.5 hours, and removing water to obtain polymers,
    2) halogenating the polymers obtained in step 1) using a halogenating agent at the presence of an initiator at 60-120° C. for 0.5-5 hours to obtain an intermediate halogenated product, and
    3) adding the intermediate halogenated product and maleic acid into a reactor in turn, allowing the mixture to react at 120-150° C. for 1-3 hours, raising the temperature to 200-280° C., allowing polymerization reaction to proceed for 2-8 hours, and removing water to obtain the target molding optimizing agent, wherein
    the polyol, the unsaturated polycarboxylic acid and the amino acid are present at a molar ratio of 1:0.1-20: 0.01-50,
    the mass ratio of the polymers to the halogenating agent is 1:0.2-1, and
    the mass ratio of the intermediate halogenated products to maleic acid is 1:1.5-10.

3. The composite panel of claim 1, wherein the polyol is one or more selected from the group consisting of ethylene glycol, 1,2-propanediol, dipropylene glycol, 1,4-butanediol, 1,6-hexanediol, neopentyl glycol, diethylene glycol, dipropylene glycol, trihydroxymethyl propane, pentaerythrotol and glycerol.

4. The composite panel of claim 1, wherein the unsaturated polycarboxylic acid is one or more polycarboxylic acids having 20 or less carbon atoms.

5. The composite panel of claim 1, made of the following materials at the mass ratio:

| | |
|---|---|
| PVC resin or PVC powder | 100 parts, |
| Stone powder or sawdust | 210-270 parts, |
| Perlite | 0-80 parts, |
| a stabilizer | 2-6 parts, |
| Stearic acid | 0.2-0.8 part, |
| PE wax | 0.2-0.8 part, |
| Chlorinated polyethylene | 1-5 parts, |
| an ACR modifier | 0.5-2 parts, |
| Titanium dioxide powder | 1-5 parts, |
| a whitening agent | 0.01-0.05 part, and |
| a molding optimizing agent | 0.1-0.5 part. |

6. The composite panel of claim 1, wherein the at least one functional layer is one or more selected from the group consisting of a patterned layer, a wear-resistant layer, a coating layer, a veneer layer, a thermal insulating layer, a waterproof layer, a skid-proof layer, and an adhesive layer.

7. The composite panel of claim 1, wherein the at least one functional layer is made of one or more composite materials selected from the group consisting of wood, a non-woven fabric, bamboo, a wooden board, a bamboo board, a metal board, a WPC sheet, a PVC sheet, a LVT plate, a calcium silicate board, an aluminum plastic sheet, a plastic sheet, a PVC coiled sheet, a bamboo-wood composite board, an aluminum-magnesium sheet, a wood-plastic board, a stone board, a volcanic lime sheet, a calcium silicon carbonate board, a plastic film, a gypsum board, a glass sheet, a foam board, a melamine plate, a PVC wear-resistant layer, a PVC patterned sheet, a PVC cushion, and a PE film.

8. The composite panel of claim 1, wherein:
a crosslinking layer is disposed between the substrate layer and the at least one functional layer, and
when multiple functional layers are disposed above or below the substrate layer, a crosslinking layer is disposed between each two adjacent functional layers, wherein the crosslinking layer is used to increase the bonding strength of each two adjacent layers.

9. The composite panel of claim 8, wherein:
the crosslinking layer is obtained by mixing the following materials at the mass ratio and then subjecting the resulting mixture to extrusion molding,

| | |
|---|---|
| a crosslinking particle | 100 parts, |
| a filler | 50-70 parts, and |
| an additive | 1-10 parts, | the filler is one or more selected from the group consisting of carbon black, white carbon black (silica), titanium dioxide powder, precipitated calcium carbonate, silicic acid, and silicon oxide,
the additive is one or more selected from the group consisting of an antioxidant, a plasticizer, a crosslinker, a stabilizer, a thermal sensitizer, a dye, and a surfactant, and
the crosslinking particle is obtained by polymerizing the following materials at the molar ratio, followed by pulverization, screening and granulation of the resulting polymers,

| | |
|---|---|
| a polycarboxylic acid | 1 part, |
| a polyamine | 0.1-10 parts, and |
| Vinyl chloride | 1-10 parts. |

10. The composite panel of claim 9, wherein:
the crosslinking particle is prepared by adding the polycarboxylic acid and the polyamine into a reactor in turn, allowing the mixture to react at 120-150° C. for 1-3 hours, removing water, adding vinyl chloride, allowing high-pressure polymerization reaction of the mixture to proceed at 220-280° C. for 0.5-5 hours to obtain a crosslinking substrate, and cooling and screening the crosslinking substrate to obtain crosslinking particles,
the polycarboxylic acid is one or more selected from the group consisting of a dicarboxylic acid and a tricarboxylic acid each having 6 or less carbon atoms, and
the polyamine is one or more polyamines each having 12 or less carbon atoms.

11. The composite panel of claim 1, wherein:
the layers of the composite panel is subject to one-pass or multi-pass or continuous molding by means of cold press molding or hot press molding at room temperature,
the cold press molding or the hot press molding is performed at a pressure of 8-12 kg/cm$^2$,
the cold press molding or the hot press molding is performed for 10-100 minutes,
the cold press molding is done at a temperature of 10-35° C., and
the hot press molding is done at a temperature of 60-180° C.

12. The composite panel of claim 1, wherein:
a UV coating is disposed at the uppermost part of the composite panel, and
the UV coating is disposed on the composite panel by brushing on the composite panel with a UV paint, and then irradiating to harden the UV paint with a lighting equipment at wavelengths of 200 nm-450 nm.

13. The composite panel of claim 12, wherein:
the UV paint is prepared by using the following starting materials at the mass ratio:

| | |
|---|---|
| a copolymer | 30-50%, |
| an active monomer | 40-60%, |
| a photo-initiator | 3-10%, and |
| an additive | 1-10%, | the polymer is produced by oligomerization of one or more selected from the group consisting of acrylic anhydride, alkyl acrylic anhydride and 2,4-pentadienoic acid, with one or more amino acids, cis-butadiene and/or trans-butadiene, and one or more selected from the group consisting of a diol, a triol, and a tetraol having 6 or less carbon atoms,
the active monomer is one or more acrylic esters,
the photo-initiator is one or more free radical-creating photo-initiators, and
the additive is one or more selected from the group consisting of an adhesion promoter, a defoamer, a leveling agent, a wetting agent, and an antioxidant.

14. The composite panel of claim 12, wherein, alumina particles and/or silicon carbide particles having a particle size of 20-300 μm are distributed in the UV paint.

* * * * *